(12) United States Patent
Kwatra et al.

(10) Patent No.: US 12,149,568 B2
(45) Date of Patent: Nov. 19, 2024

(54) MEETING CONTENT SUMMARIZATION FOR DISCONNECTED PARTICIPANTS

(71) Applicant: International Business Machines Corporation, Armonk, NY (US)

(72) Inventors: Shikhar Kwatra, San Jose, CA (US); Raghuveer Prasad Nagar, Kota (IN); Saurabh Yadav, Bangalore (IN); Sushain Pandit, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 17/649,210

(22) Filed: Jan. 28, 2022

(65) Prior Publication Data

US 2023/0275938 A1  Aug. 31, 2023

(51) Int. Cl.
*H04L 65/403* (2022.01)
*H04L 29/08* (2006.01)
*H04L 65/1083* (2022.01)
*G06V 20/40* (2022.01)
*G10L 25/57* (2013.01)

(52) U.S. Cl.
CPC ........ *H04L 65/1083* (2013.01); *H04L 65/403* (2013.01); *G06V 20/47* (2022.01); *G10L 25/57* (2013.01)

(58) Field of Classification Search
None
See application file for complete search history.

(56) References Cited

U.S. PATENT DOCUMENTS

| | | | |
|---|---|---|---|
| 7,308,476 B2 | 12/2007 | Mannaru | |
| 7,716,532 B2 | 5/2010 | Horvitz | |
| 8,001,126 B2 | 8/2011 | Edmond | |
| 10,977,258 B1 | 4/2021 | Liu | |
| 2012/0162349 A1* | 6/2012 | Alexandrov | H04L 12/1831 348/E7.083 |

(Continued)

FOREIGN PATENT DOCUMENTS

| | | |
|---|---|---|
| CN | 102238160 B | 5/2014 |
| CN | 112822433 B | 7/2021 |

*Primary Examiner* — Natisha D Cox
(74) *Attorney, Agent, or Firm* — Intelletek Law Group, PLLC; Gabriel Daniel, Esq.

(57) ABSTRACT

In an approach to meeting summarization for disconnected participants, one or more computer processors detect a start of a collaborative meeting. One or more computer processors monitor a connection to the collaborative meeting of each of one or more participants. One or more computer processors determine a first participant of the one or more participants has disconnected from the collaborative meeting. One or more computer processors record the collaborative meeting. One or more computer processors determine the first participant has re-connected with the collaborative meeting. One or more computer processors synthesize, a first summary of a portion of the collaborative meeting missed by the first participant. One or more computer processors to synthesize, a second summary of a portion of the collaborative meeting recorded after the first participant re-connected with the collaborative meeting. One or more computer processors present the first summary and the second summary to the first participant.

20 Claims, 3 Drawing Sheets

(56) References Cited

U.S. PATENT DOCUMENTS

| | | |
|---|---|---|
| 2016/0285929 A1* | 9/2016 | Oganezov ............. H04L 65/765 |
| 2017/0070406 A1* | 3/2017 | Yanagisawa ........ H04L 43/0811 |
| 2017/0093935 A1 | 3/2017 | Caston |
| 2018/0077099 A1* | 3/2018 | Silva ....................... H04L 51/04 |
| 2022/0286312 A1* | 9/2022 | Tiwari ................ H04L 12/1822 |
| 2022/0337443 A1* | 10/2022 | Sood ...................... G06V 20/20 |
| 2022/0407900 A1* | 12/2022 | Gawande ................ G06F 40/10 |

* cited by examiner

MEETING CONTENT SUMMARIZATION FOR DISCONNECTED PARTICIPANTS

BACKGROUND OF THE INVENTION

The present invention relates generally to the field of natural language processing, and more particularly to meeting summarization for disconnected participants.

Natural language processing (NLP) is a field of computer science, artificial intelligence, and linguistics concerned with the interactions between computers and human (natural) languages. As such, natural language processing is related to the area of human-computer interaction. Many challenges in natural language processing involve natural language understanding, that is, enabling computers to derive meaning from human or natural language input.

Web conferencing is used as an umbrella term for various types of online conferencing and collaborative services including webinars ("web seminars"), webcasts, and web meetings. Web conferencing offers data streams of text-based messages, voice, and video chat to be shared simultaneously across geographically dispersed locations. Applications for web conferencing include meetings, training events, lectures, or presentations from a web-connected computer to other web-connected computers. Depending on the technology being used, participants may speak and listen to audio over standard telephone lines or via computer microphones and speakers. Some products allow for use of a webcam to display participants, as well as screen sharing capability for display of content from a participant's computer.

SUMMARY

Embodiments of the present invention disclose a computer-implemented method, a computer program product, and a system for meeting summarization for disconnected participants. The computer-implemented method may include one or more computer processors detecting a start of a collaborative meeting. One or more computer processors monitor a connection to the collaborative meeting of each of one or more participants. One or more computer processors determine a first participant of the one or more participants has disconnected from the collaborative meeting. One or more computer processors record the collaborative meeting. One or more computer processors determine the first participant has re-connected with the collaborative meeting. One or more computer processors synthesize, from the recording, a first summary of a portion of the collaborative meeting missed by the first participant while the first participant was disconnected. One or more computer processors to synthesize, from the recording, a second summary of a portion of the collaborative meeting recorded after the first participant re-connected with the collaborative meeting. One or more computer processors present the first summary and the second summary to the first participant.

DETAILED DESCRIPTION

When attending a web conference, or an online collaborative meeting, there are situations where participants may have network connectivity issues leading to information loss. In such scenarios, when the participant reconnects to the call, some part of the meeting is missed, and the participant will likely lose some meeting context. This can lead to lack of productivity for some of the participants. Embodiments of the present invention recognize that efficiency may be gained by providing a system that can detect when a user is temporarily disconnected from an online collaborative meeting, start recording the missed collaboration part of the meeting, including audio and/or video, for the disconnected participant, and generate a summary from the recording. Embodiments of the present invention recognize that efficiency may also be gained by providing the summary to the participant upon reconnection, such that the participant does not have to interrupt the collaborative meeting to be brought up to speed on content that was missed. Embodiments of the present invention further recognize that efficiency may be gained by determining which portions of the summary are relevant to the user and presenting the relevant portions of the summary upon reconnection while storing determined irrelevant portions for later consumption. Implementation of embodiments of the invention may take a variety of forms, and exemplary implementation details are discussed subsequently with reference to the Figures.

Figure 1:
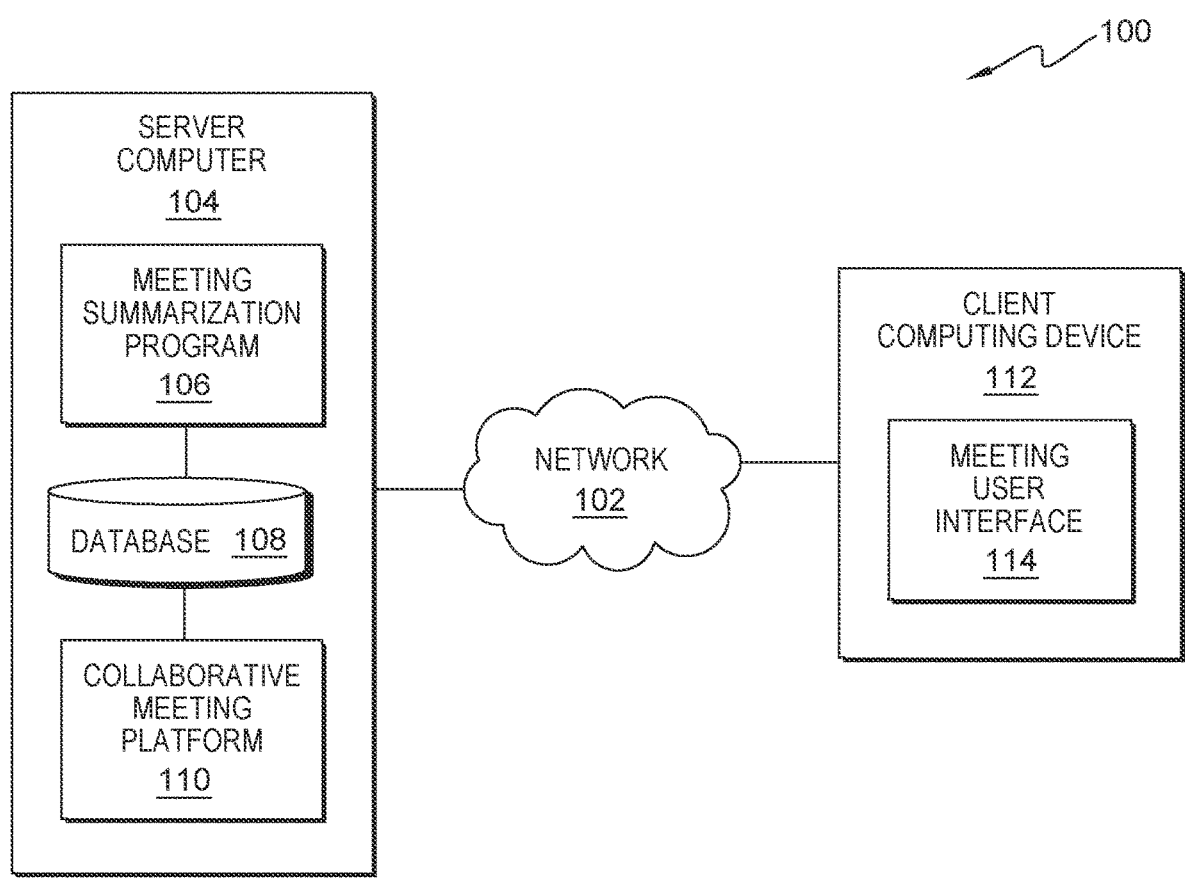
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 112 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104 and client computing device 112, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes meeting summarization program 106, database 108, and collaborative meeting platform 110. Server computer 104 may include internal and external hardware components, as depicted and described in further detail with respect to FIG. 3.

Meeting summarization program 106 detects a disconnection of a participant from an online collaborative meeting and records the meeting until the participant re-connects. Meeting summarization program 106 applies speech and natural language synthesis techniques, as well as correlation to the visuals, i.e., associated video and presentation materials, to synthesize a summary of the meeting content the participant missed from the recording. In the depicted embodiment, meeting summarization program 106 is a standalone program. In another embodiment, meeting summarization program 106 is integrated into collaborative meeting platform 110. In an embodiment, an individual user signs up for the service performed by meeting summarization program 106. In another embodiment, an organization, such as a company or a department within a company, signs up for the service performed by meeting summarization program 106.

Meeting summarization program 106 detects a collaborative meeting start and monitors the online connections of the meeting participants. If meeting summarization program 106 detects a participant is disconnected, then meeting summarization program 106 records the collaborative meeting. If meeting summarization program 106 detects the participant re-connects with the online meeting, then meeting summarization program 106 timestamps the recording for the missed portion of the meeting. Meeting summarization program 106 synthesizes a summary of the missed portion, while continuing to record the meeting. Meeting summarization program 106 determines the time required to present the summary to the participant. Meeting summarization program 106 ends the recording at the determined time and synthesizes a summary of the continued recording. Meeting summarization program 106 presents the relevant portion of the summaries of the missed portion and the continued recording. Meeting summarization program 106 detects the end of the collaborative meeting and presents the irrelevant portion of the summaries of the missed portion and the continued recording. Meeting summarization program 106 is depicted and described in further detail with respect to FIG. 2.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts begin with a written notification that the user's information may be recorded or monitored and may be saved, for the purpose of summarizing meeting content. These embodiments may also include periodic reminders of such recording and monitoring throughout the course of any such use. Certain embodiments may also include regular (e.g., daily, weekly, monthly) reminders to the participating parties that they have consented to being recorded and monitored for summarizing meeting content and may provide the participating parties with the opportunity to opt-out of such recording and monitoring if desired. Furthermore, to the extent that any non-participating parties' actions are monitored (for example, when outside vehicles are viewed), such monitoring takes place for the limited purpose of providing navigation assistance to a participating party, with protections in place to prevent the unauthorized use or disclosure of any data for which an individual might have a certain expectation of privacy.

Database 108 stores information used by and generated by meeting summarization program 106 and/or collaborative meeting platform 110. In the depicted embodiment, database 108 resides on server computer 104. In another embodiment, database 108 may reside elsewhere within distributed data processing environment 100, provided that meeting summarization program 106 has access to database 108. A database is an organized collection of data. Database 108 can be implemented with any type of storage device capable of storing data and configuration files that can be accessed and utilized by meeting summarization program 106, such as a database server, a hard disk drive, or a flash memory. Database 108 stores the summaries synthesized by meeting summarization program 106. Database 108 stores a knowledge corpus for each collaborative meeting participant that signed up for the service performed by meeting summarization program 106. The knowledge corpus may include, but is not limited to, the calendar of the participant, which may include training sessions, classes, meetings, etc., one or more social network affiliations, which may include blogs, posts, discussions, contacts, etc., an internet searching/browsing history of the participant, and other information that enables meeting summarization program 106 to synthesize an appropriate summary from a collaborative meeting.

Database 108 also stores user profiles submitted by meeting participants, such as the user of client computing device 112, via meeting user interface 114. The user profiles may include, but are not limited to, the name of the user, the age of the user, an address, an email address, a voice sample, a phone number, a location, a credit card number, an account number, an employer, a job role, a job family, a business unit association, a job seniority, a job level, a resume, an education history, expertise, a medical record, a social network affiliation, etc. The user profile may also include user preferences, such as defaults for collaborative meeting platform 110, for example, whether to initially mute the microphone associated with client computing device 112 or whether to initially keep a camera associated with client computing device 112 turned off. In addition, the user profile may include user preferences for the presentation of a summary synthesized by meeting summarization program 106. For example, one participant may prefer a visual, text-based summary while a second participant may prefer the summary in to include the video recording. In another example, a participant may specify a speed for fast-forward mode with which the participant is comfortable. In yet another example, a participant may specify a preference for either a system-generated voice or the speaker's voice in the summary.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Meeting summarization program 106 enables the authorized and secure processing of personal data. Meeting summarization program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Meeting summarization program 106 provides information regarding personal data and the nature (e.g., type, scope, purpose, duration, etc.) of the processing. Meeting summarization program 106 provides the user with copies of stored personal data. Meeting summarization program 106 allows the correction or completion of incorrect or incomplete personal data. Meeting summarization program 106 allows the immediate deletion of personal data.

Collaborative meeting platform 110 is one of a plurality of available software packages or online services with which users can hold live meetings, conferencing, presentations, and training via the Internet, particularly on TCP/IP connections. Collaborative meeting platform 110 may also be known as online meeting software or, sometimes, simply video conferencing. Collaborative meeting platform 110 enables remote meetings based on Voice over Internet Protocol (VOIP), online video, instant messaging, file sharing, and screen sharing.

Client computing device 112 can be one or more of a laptop computer, a tablet computer, a smart phone, smart watch, a smart speaker, or any programmable electronic device capable of communicating with various components and devices within distributed data processing environment 100, via network 102. Client computing device 112 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 112 may be integrated into a vehicle of the user. For example, client computing device 112 may include a heads-up display in the windshield of the vehicle. In general, client computing device 112 represents one or more programmable electronic devices or combination of programmable electronic devices capable of executing machine readable program instructions and communicating with other computing devices (not shown) within distributed data processing environment 100 via a network, such as network 102. Client computing device 112 includes an instance of meeting user interface 114.

Meeting user interface 114 provides an interface between a user of client computing device 112 and meeting summarization program 106 and collaborative meeting platform 110, on server computer 104. In one embodiment, meeting user interface 114 is mobile application software. Mobile application software, or an "app," is a computer program designed to run on smart phones, tablet computers and other mobile devices. In one embodiment, meeting user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Meeting user interface 114 enables a user of client computing device 112 to participate in meetings held using collaborative meeting platform 110. Meeting user interface 114 enables a user of client computing device 112 to complete a user profile and store the profile in database 108. Meeting summarization program 106 interacts with and uses meeting user interface 114 to provide a summary of meeting content to participants in a collaborative meeting that were temporarily disconnected from the meeting, as well as to receive input from the participants.

Figure 2:
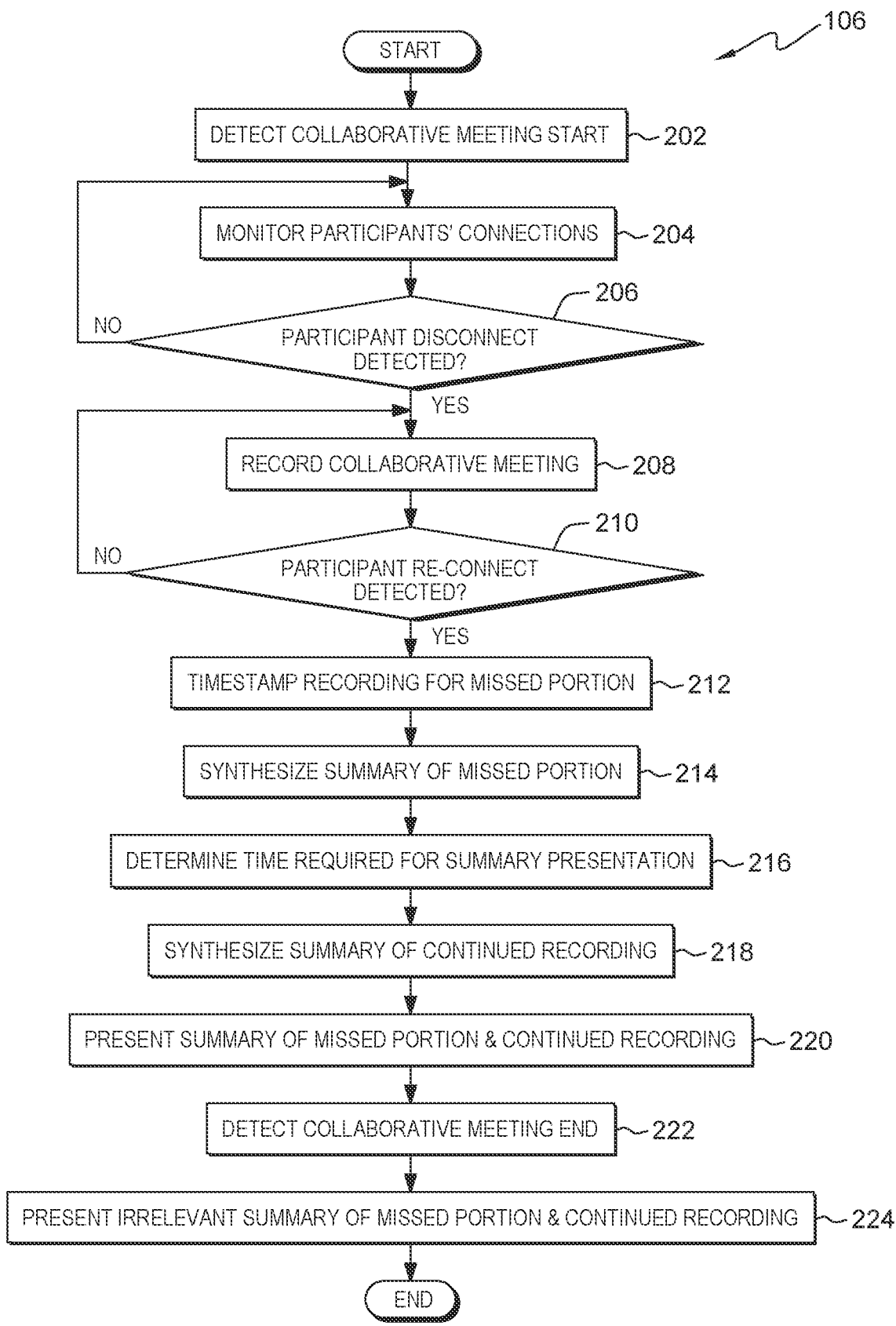
FIG. 2 is a flowchart depicting operational steps of a meeting summarization program, on a server computer within the distributed data processing environment of FIG. 1, for summarizing meeting content for disconnected participants, in accordance with an embodiment of the present invention.

FIG. 2 is a flowchart depicting operational steps of meeting summarization program 106, on server computer 104 within distributed data processing environment 100 of FIG. 1, for summarizing meeting content for disconnected participants, in accordance with an embodiment of the present invention.

Meeting summarization program 106 detects a collaborative meeting start (step 202). In an embodiment, when a user of client computing device 112 initiates a web conference meeting on collaborative meeting platform 110, via meeting user interface 114, meeting summarization program 106 detects the meeting initiation. In one embodiment, meeting summarization program 106 detects a meeting participant clicking on a link in meeting user interface 114 to initiate the collaborative meeting. In another embodiment, meeting summarization program 106 detects a participant sending a meeting notice, through collaborative meeting platform 110, an email application (not shown), or a calendaring application (not shown). In another embodiment, meeting summarization program 106 detects a collaborative meeting start when a participant uploads a meeting agenda to collaborative meeting platform 110. In yet another embodiment, meeting summarization program 106 detects a collaborative meeting start when a participant initiates meeting summarization program 106.

Meeting summarization program 106 monitors the online connections of the meeting participants (step 204). In an embodiment, meeting summarization program 106 monitors the connection of the devices associated with the one or more participants, such as client computing device 112, to collaborative meeting platform 110, via network 102. For example, meeting summarization program 106 may monitor the status of a list of participants provided by collaborative meeting platform 110. In another example, meeting summarization program 106 may monitor the actual network connection of the device associated with each participant.

Meeting summarization program 106 determines whether any participant disconnection is detected (decision block 206). In an embodiment, based on the monitoring, meeting summarization program 106 determines whether one or more meeting participants is disconnected from collaborative meeting platform 110. For example, meeting summarization program 106 determines a device associated with the one or more participants is not connected to meeting platform 110 via network 102. In another example, in the status of a list of participants provided by collaborative meeting platform 110, meeting summarization program 106 detects that the status of a participant changed from a green dot to an open circle, indicating that the participant has logged out and is no longer participating in the collaborative meeting. In another embodiment, meeting summarization program 106 determines a participant has disconnected from collaborative meeting platform 110 when a connected participant states that the disconnected participant is not connected. For example, if a connected participant states "Joe is not responding. I think he logged out," then meeting summarization program 106, using one or more natural language processing (NLP) techniques, detects that Joe is disconnected from collaborative meeting platform 110.

If meeting summarization program 106 does not detect a participant is disconnected ("no" branch, decision block 206), then meeting summarization program 106 returns to decision block 206 and continues to monitor participants' connections to the collaborative meeting.

If meeting summarization program 106 detects a participant is disconnected ("yes" branch, decision block 206), then meeting summarization program 106 records the collaborative meeting (step 208). In an embodiment, in response to detecting that one or more participants are disconnected, meeting summarization program 106 begins recording the collaborative meeting. For example, meeting summarization program 106 records the audio component of the collaborative meeting to capture the presentation and/or discussion. In another example, meeting summarization program 106 records any video component associated with the collaborative meeting, such as a presentation and/or any images shown on a screen associated with client computing device 112 during the collaborative meeting. In an embodiment, meeting summarization program 106 determines whether the collaborative meeting is being recorded by collaborative meeting platform 110 prior to beginning to record the meeting. If meeting summarization program 106 determines the meeting is already being recorded, then meeting summarization program 106 determines a timestamp of the detection of the disconnection of a participant, to be used in a later step, rather than duplicating the recording. In an embodiment, meeting summarization program 106 determines if the participant is disconnected for more than a pre-defined threshold amount of time before starting the recording. For example, meeting summarization program 106 may determine whether the participant dropped the connection for more than ten seconds, and, if so, then meeting summarization program 106 starts recording the meeting.

Meeting summarization program 106 determines whether a disconnected participant has re-connected (decision block 210). In an embodiment, as discussed with respect to step 204, meeting summarization program 106 continues to monitor the connection of the devices of the one or more participants, such as client computing device 112, to collaborative meeting platform 110, via network 102. While monitoring connections to collaborative meeting platform 110, meeting summarization program 106 determines whether a participant that had disconnected has re-connected. For example, in the status of a list of participants provided by collaborative meeting platform 110, meeting summarization program 106 detects that the status of a participant changed from an open circle to a green dot, indicating that the participant has logged back into the collaborative meeting. In another embodiment, meeting summarization program 106 determines a participant has re-connected to collaborative meeting platform 110 when a connected participant states that the disconnected participant is now re-connected. For example, if a connected participant states "Joe is online again," then meeting summarization program 106 detects that Joe is re-connected to collaborative meeting platform 110.

If meeting summarization program 106 determines a disconnected participant has not re-connected ("no" branch, decision block 210), then meeting summarization program 106 returns to step 208 and continues to record the collaborative meeting.

If meeting summarization program 106 detects the participant re-connects with the online meeting ("yes" branch, decision block 210), then meeting summarization program 106 timestamps the recording for the missed portion of the meeting (step 212). In an embodiment, meeting summarization program 106 marks the recording with a timestamp of the participant re-connection in order to define the missed portion of the meeting in the recording. In the embodiment, meeting summarization program 106 continues recording the meeting.

Meeting summarization program 106 synthesizes a summary of the missed portion (step 214). In an embodiment, in parallel with continuing the recording, meeting summarization program 106 generates a summary of the missed portion of the collaborative meeting for later presentation to the re-connected participant. In an embodiment, meeting summarization program 106 combines both audio and video components of the recording into the summary. In an embodiment, meeting summarization program 106 analyzes the recording using one or more speech and/or visual-correlation analysis techniques. For example, meeting summarization program 106 may use speech-to-text conversion, NLP-based syntax and semantic analysis, latent semantic analysis (LSA), object detection, etc., as would be recognized by a person of skill in the art. In an embodiment, meeting summarization program 106 synthesizes the summary based on information retrieved from the knowledge corpus of the participant stored in database 108. For example, meeting summarization program 106 may not include information that the participant already knows. In an embodiment, meeting summarization program 106 synthesizes the summary based on the user profile of the participant stored in database 108. For example, meeting summarization program 106 may retrieve a preference for including images of the participants in the summary.

In an embodiment, meeting summarization program 106 divides the synthesized summary into two parts; part one is the portion of the summary that is relevant to the remaining collaboration and part two is the portion of the summary that is not relevant to the remaining collaboration. By dividing the summary into two summaries, meeting summarization program 106 can present the specific content that the re-connected participant needs to know in order to participate in the rest of the collaborative meeting, thus saving time. In an embodiment, meeting summarization program 106 determines which portions of the summary are relevant based on at least one of the agenda of the collaborative meeting, the knowledge corpus associated with the re-connected participant, and/or the user profile associated with the re-connected participant.

Meeting summarization program 106 determines the time required to present the summary to the participant (step 216). In an embodiment, meeting summarization program 106 analyzes the generated summary to determine the length of time it will take for the re-connected participant to review the summary. In an embodiment, meeting summarization program 106 considers one or more preferences of the participant when determining the time. For example, meeting summarization program 106 may use the preferred speed of fast forward to determine the time required to present the summary.

Meeting summarization program 106 synthesizes a summary of the continued recording (step 218). In an embodiment, meeting summarization program 106 ends the continued recording after the length of time determined in the previous step and generates a summary of the continued recording of the collaborative meeting for later presentation to the re-connected participant. Meeting summarization program 106 synthesizes the summary of the continued recording using one or more of the same techniques discussed with respect to step 214. In an embodiment, meeting summarization program 106 divides the synthesized summary of the continued recording into a relevant portion and an irrelevant portion, as discussed with respect to step 214.

Meeting summarization program 106 presents the summaries of the missed portion and the continued recording (step 220). In an embodiment, meeting summarization program 106 presents the summary of the missed portion of the collaborative meeting followed by the summary of the continued recording to the re-connected participant via meeting user interface 114. In an embodiment, meeting summarization program 106 considers one or more preferences of the participant included in the user profile stored in database 108 when presenting the summaries. For example, meeting summarization program 106 presents the summary at the preferred speed and/or with the preferred voice. In an embodiment where meeting summarization program 106 creates a relevant portion and an irrelevant portion of each of the summaries, meeting summarization program 106 presents the relevant portion of the summary of the missed portion of the collaborative meeting followed by the relevant portion of the summary of the continued recording, which the participant may appreciate as more efficient than reviewing irrelevant information during the live meeting. Once the participant has viewed the summaries, the participant is caught up and re-joins the live meeting. In an embodiment, meeting summarization program 106 only presents the summary of the missed portion and prompts the participant for whether the participant wants to review the summary of the continued recording, via meeting user interface 114. If the participant responds to the prompt positively, then meeting summarization program 106 presents the summary of the continued recording.

In an embodiment, the participant can interact with the summary, via meeting user interface 114, to change one or more parameters of the presentation. The participant may change the one or more parameters based on knowledge or expertise in the subject matter being presented. For example, the participant may increase the playback speed if the participant is well versed in the subject matter. In another example, the participant may pause and/or rewind a portion of the summary if the participant is unfamiliar with the subject matter. In an embodiment where meeting summarization program 106 includes a machine learning model (not shown), meeting summarization program 106 uses the participant's interaction with the playback of the summaries as training data to auto classify a user profile. Over several meeting instances, meeting summarization program 106 learns the preferences of the participant regarding presentation of the summaries. For example, meeting summarization program 106 can pre-empt the need for the participant to interact with the presentation since meeting summarization program 106 can automatically take the preferred actions in the future, thus enhancing the experience of the participant. In another example, meeting summarization program 106 can make suggestions to the participant, and to other participants with a similar user profile, for actions to take during the presentation.

Meeting summarization program 106 detects the end of the collaborative meeting (step 222). In an embodiment, meeting summarization program 106 determines the collaborative meeting has ended. For example, meeting summarization program 106 may determine that all participants have logged out of collaborative meeting platform 110. In another example, meeting summarization program 106 may detect the participants saying goodbye to one another.

Meeting summarization program 106 presents the irrelevant portion of the summaries of the missed portion and the continued recording (step 224). In an embodiment where meeting summarization program 106 creates a relevant portion and an irrelevant portion of each of the summaries, meeting summarization program 106 presents the irrelevant portion of the summary of the missed portion of the collaborative meeting followed by the irrelevant portion of the summary of the continued recording via meeting user interface 114. In one embodiment, meeting summarization program 106 prompts the participant, via meeting user interface 114, to determine whether the participant is interested in viewing the irrelevant portions before presenting the irrelevant portions. In another embodiment, meeting summarization program 106 stores the irrelevant portions in database 108 such that the participant can retrieve them at a convenient time.

In an example scenario of the use of meeting summarization program 106, user 1, user 2, and user 3 are having a collaborative meeting and meeting summarization program 106 monitors the participants' connections, as discussed with respect to step 204. User 1 is presenting slides that describe a planned presentation for a future meeting. User 3 is driving while on the call and reaches a zero-network point, causing user 3 to be disconnected from the meeting for 30 seconds, and meeting summarization program 106 detects the disconnection, as discussed with respect to decision block 206. Meeting summarization program 106 begins to record the meeting, as discussed with respect to step 208. While user 3 is disconnected, user 1 displays a slide that outlines the future presentation, and user 1 and user 2 discuss that, in the future meeting, user 1 will present slides one through four, user 3 will present slide five, and user 2 will present slides six and seven. When user 3 re-connects with the collaborative meeting, meeting summarization program 106 detects the reconnection, as discussed with respect to decision block 210, timestamps the recording for the missed portion, as discussed with respect to step 212, and continues to record the call. Meeting summarization program 106 synthesizes a summary of the missed portion, as discussed with respect to step 214, and synthesizes a summary of the continued recording, as discussed with respect to step 218. Meeting summarization program 106 presents the summaries to user 3 in fast forward mode, showing the outline slide and including the discussion of the slides that user 3 will present since that portion of the discussion is relevant to user 3, as discussed with respect to step 220. Thus, user 3 is brought up to speed without having to feel uncomfortable, asking for information to be repeated, and without delaying the collaborative meeting. Upon conclusion of the collaborative meeting, meeting summarization program 106 offers user 3 an opportunity to review the missed portion of the meeting that was not specifically relevant to user 3, as discussed with respect to step 224.

Figure 3:
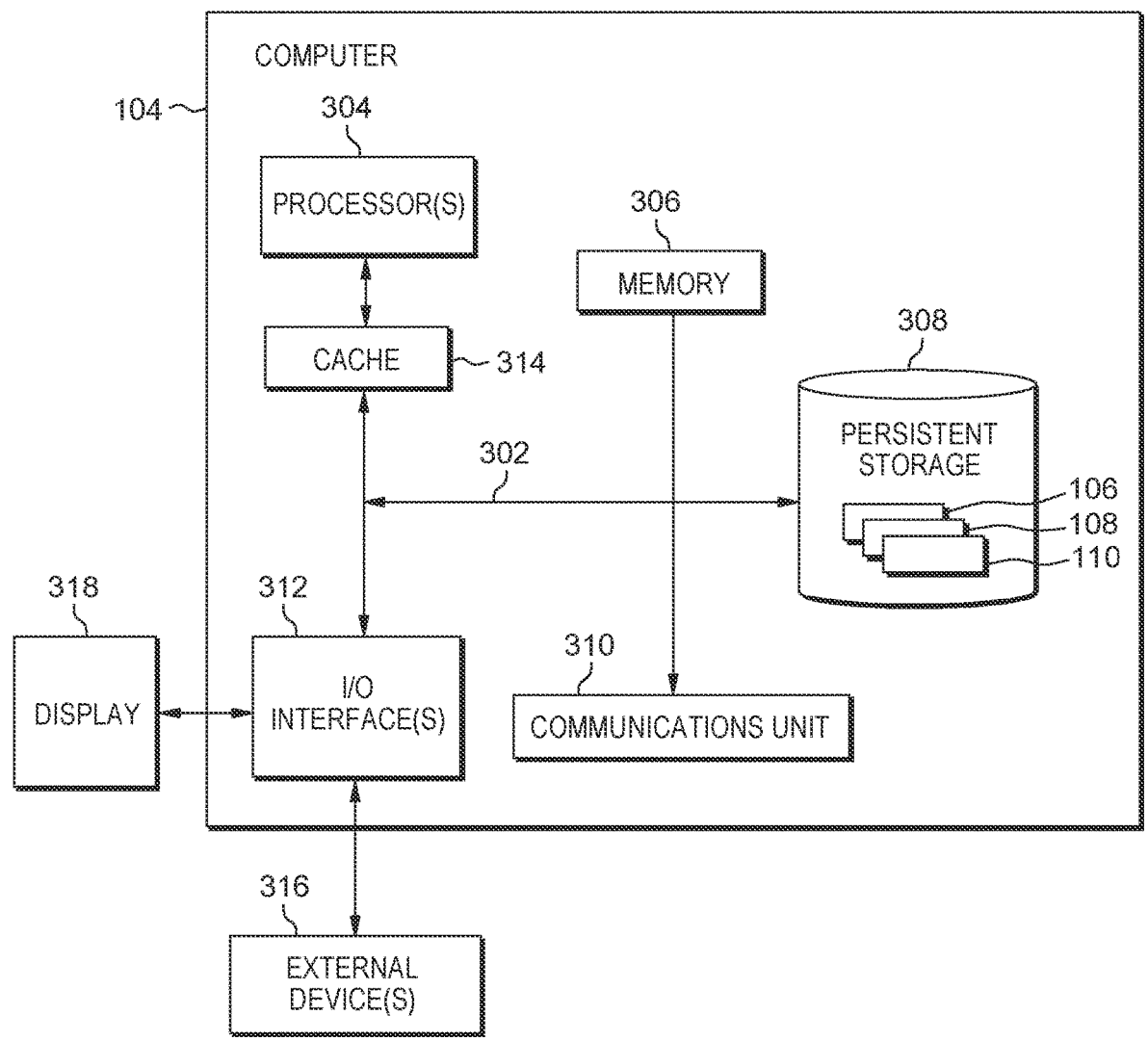
FIG. 3 depicts a block diagram of components of the server computer executing the meeting summarization program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., meeting summarization program 106, database 108, and collaborative meeting platform 110, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 112. In these examples, communications unit 310 includes one or more network interface cards. Communications unit 310 may provide communications through the use of either or both physical and wireless communications links. Meeting summarization program 106, database 108, collaborative meeting platform 110, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., meeting summarization program 106, database 108, and collaborative meeting platform 110 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

detecting, by one or more computer processors, a start of a collaborative meeting;

monitoring, by one or more computer processors, a connection to the collaborative meeting of each of one or more participants;

determining, by one or more computer processors, a first participant of the one or more participants has disconnected from the collaborative meeting;

recording, by one or more computer processors, the collaborative meeting;

determining, by one or more computer processors, the first participant has re-connected with the collaborative meeting;

synthesizing, by one or more computer processors, from the recording, a first summary of a portion of the collaborative meeting missed by the first participant while the first participant was disconnected, wherein synthesizing, from the recording, the first summary of the portion of the collaborative meeting missed by the first participant is based on an agenda of the collaborative meeting;

determining, by one or more computer processors, a length of time required to present the first summary;

synthesizing, by one or more computer processors, from the recording, a second summary of a portion of the collaborative meeting recorded after the first participant re-connected with the collaborative meeting, wherein the length of time required to present the first summary is the duration of the portion of the collaborative meeting recorded after the first participant re-connected with the collaborative meeting;

retrieving, by one or more computer processors, one or more preferences of the first participant from a user profile associated with the first participant, wherein at least one of the preferences is for the first summary and the second summary to be presented with a system-generated voice;

prompting, by one or more computer processors, the first participant for whether the participant wants to review the second summary;

receiving, by one or more computer processors, a positive response to the prompt; and presenting, by one or more computer processors, the first summary and the second summary to the first participant in the system-generated voice.

2. The computer-implemented method of claim 1, further comprising:

determining, by one or more computer processors, which portion of the first summary and which portion of the second summary are relevant to the participant based on a user profile associated with the participant;

dividing, by one or more computer processors, the first summary into a relevant portion of the first summary and an irrelevant portion of the first summary;

dividing, by one or more computer processors, the second summary into a relevant portion of the second summary and an irrelevant portion of the second summary; and presenting, by one or more computer processors, the relevant portion of the first summary and the relevant portion of the second summary to the first participant.

3. The computer-implemented method of claim 2, further comprising:

detecting, by one or more computer processors, an end to the collaborative meeting; and responsive to detecting the end to the collaborative meeting, presenting, by one or more computer processors, the irrelevant portion of the first summary and the irrelevant portion of the second summary to the first participant.

4. The computer-implemented method of claim 1, further comprising:

ending, by one or more computer processors, the recording of the collaborative meeting after the determined length of time.

5. The computer-implemented method of claim 1, wherein synthesizing, from the recording, the first summary of the portion of the collaborative meeting missed by the first participant is based on at least one of: a knowledge corpus associated with the participant and a user profile associated with the first participant.

6. The computer-implemented method of claim 1, wherein presenting the first summary and the second summary to the first participant is based on at least one of one or more preferences of the first participant.

7. The computer-implemented method of claim 1, wherein determining the first participant of the one or more participants has disconnected from the collaborative meeting further comprises:

determining, by one or more computer processors, the first participant is disconnected for more than a pre-defined threshold amount of time.

8. A computer program product comprising:

one or more computer readable storage media and program instructions collectively stored on the one or more computer readable storage media, the stored program instructions comprising:

program instructions to detect a start of a collaborative meeting;

program instructions to monitor a connection to the collaborative meeting of each of one or more participants;

program instructions to determine a first participant of the one or more participants has disconnected from the collaborative meeting;

program instructions to record the collaborative meeting;

program instructions to determine the first participant has re-connected with the collaborative meeting;

program instructions to synthesize, from the recording, a first summary of a portion of the collaborative meeting missed by the first participant while the first participant was disconnected, wherein synthesizing, from the recording, the first summary of the portion of the collaborative meeting missed by the first participant is based on an agenda of the collaborative meeting;

program instructions to determine a length of time required to present the first summary;

program instructions to synthesize, from the recording, a second summary of a portion of the collaborative meeting recorded after the first participant re-connected with the collaborative meeting, wherein the length of time required to present the first summary is the duration of the portion of the collaborative meeting recorded after the first participant re-connected with the collaborative meeting;

program instructions to retrieve one or more preferences of the first participant from a user profile associated with the first participant, wherein at least one of the preferences is for the first summary and the second summary to be presented with a system-generated voice;

program instructions to prompt the first participant for whether the participant wants to review the second summary;

program instructions to receive a positive response to the prompt; and program instructions to present the first summary and the second summary to the first participant in the system-generated voice.

9. The computer program product of claim 8, the stored program instructions further comprising:

program instructions to determine which portion of the first summary and which portion of the second summary are relevant to the participant based on a user profile associated with the participant;

program instructions to divide the first summary into a relevant portion of the first summary and an irrelevant portion of the first summary;

program instructions to divide the second summary into a relevant portion of the second summary and an irrelevant portion of the second summary; and program instructions to present the relevant portion of the first summary and the relevant portion of the second summary to the first participant.

10. The computer program product of claim 9, the stored program instructions further comprising:

program instructions to detect an end to the collaborative meeting; and responsive to detecting the end to the collaborative meeting, program instructions to present the irrelevant portion of the first summary and the irrelevant portion of the second summary to the first participant.

11. The computer program product of claim 8, the stored program instructions further comprising:
program instructions to end the recording of the collaborative meeting after the determined length of time.

12. The computer program product of claim 8, wherein the program instructions to synthesize, from the recording, the first summary of the portion of the collaborative meeting missed by the first participant is based on at least one of: a knowledge corpus associated with the participant and a user profile associated with the first participant.

13. The computer program product of claim 8, wherein the program instructions to present the first summary and the second summary to the first participant are based on at least one of one or more preferences of the first participant.

14. The computer program product of claim 8, wherein the program instructions to determine the first participant of the one or more participants has disconnected from the collaborative meeting comprise:
program instructions to determine the first participant is disconnected for more than a pre-defined threshold amount of time.

15. A computer system comprising:
one or more computer processors;
one or more computer readable storage media;
program instructions collectively stored on the one or more computer readable storage media for execution by at least one of the one or more computer processors, the stored program instructions comprising:
program instructions to detect a start of a collaborative meeting;
program instructions to monitor a connection to the collaborative meeting of each of one or more participants;
program instructions to determine a first participant of the one or more participants has disconnected from the collaborative meeting;
program instructions to record the collaborative meeting;
program instructions to determine the first participant has re-connected with the collaborative meeting;
program instructions to synthesize, from the recording, a first summary of a portion of the collaborative meeting missed by the first participant while the first participant was disconnected, wherein synthesizing, from the recording, the first summary of the portion of the collaborative meeting missed by the first participant is based on an agenda of the collaborative meeting;
program instructions to determine a length of time required to present the first summary;
program instructions to synthesize, from the recording, a second summary of a portion of the collaborative meeting recorded after the first participant re-connected with the collaborative meeting, wherein the length of time required to present the first summary is the duration of the portion of the collaborative meeting recorded after the first participant re-connected with the collaborative meeting;

program instructions to retrieve one or more preferences of the first participant from a user profile associated with the first participant, wherein at least one of the preferences is for the first summary and the second summary to be presented with a system-generated voice;
program instructions to prompt the first participant for whether the participant wants to review the second summary;
program instructions to receive a positive response to the prompt; and
program instructions to present the first summary and the second summary to the first participant in the system-generated voice.

16. The computer system of claim 15, the stored program instructions further comprising:
program instructions to determine which portion of the first summary and which portion of the second summary are relevant to the participant based on a user profile associated with the participant;
program instructions to divide the first summary into a relevant portion of the first summary and an irrelevant portion of the first summary;
program instructions to divide the second summary into a relevant portion of the second summary and an irrelevant portion of the second summary; and
program instructions to present the relevant portion of the first summary and the relevant portion of the second summary to the first participant.

17. The computer system of claim 16, the stored program instructions further comprising:
program instructions to detect an end to the collaborative meeting; and
responsive to detecting the end to the collaborative meeting, program instructions to present the irrelevant portion of the first summary and the irrelevant portion of the second summary to the first participant.

18. The computer system of claim 15, the stored program instructions further comprising:
program instructions to end the recording of the collaborative meeting after the determined length of time.

19. The computer system of claim 15, wherein the program instructions to synthesize, from the recording, the first summary of the portion of the collaborative meeting missed by the first participant is based on at least one of: a knowledge corpus associated with the participant and a user profile associated with the first participant.

20. The computer system of claim 15, wherein the program instructions to determine the first participant of the one or more participants has disconnected from the collaborative meeting comprise:
program instructions to determine the first participant is disconnected for more than a pre-defined threshold amount of time.

\* \* \* \* \*